Patented Jan. 16, 1934

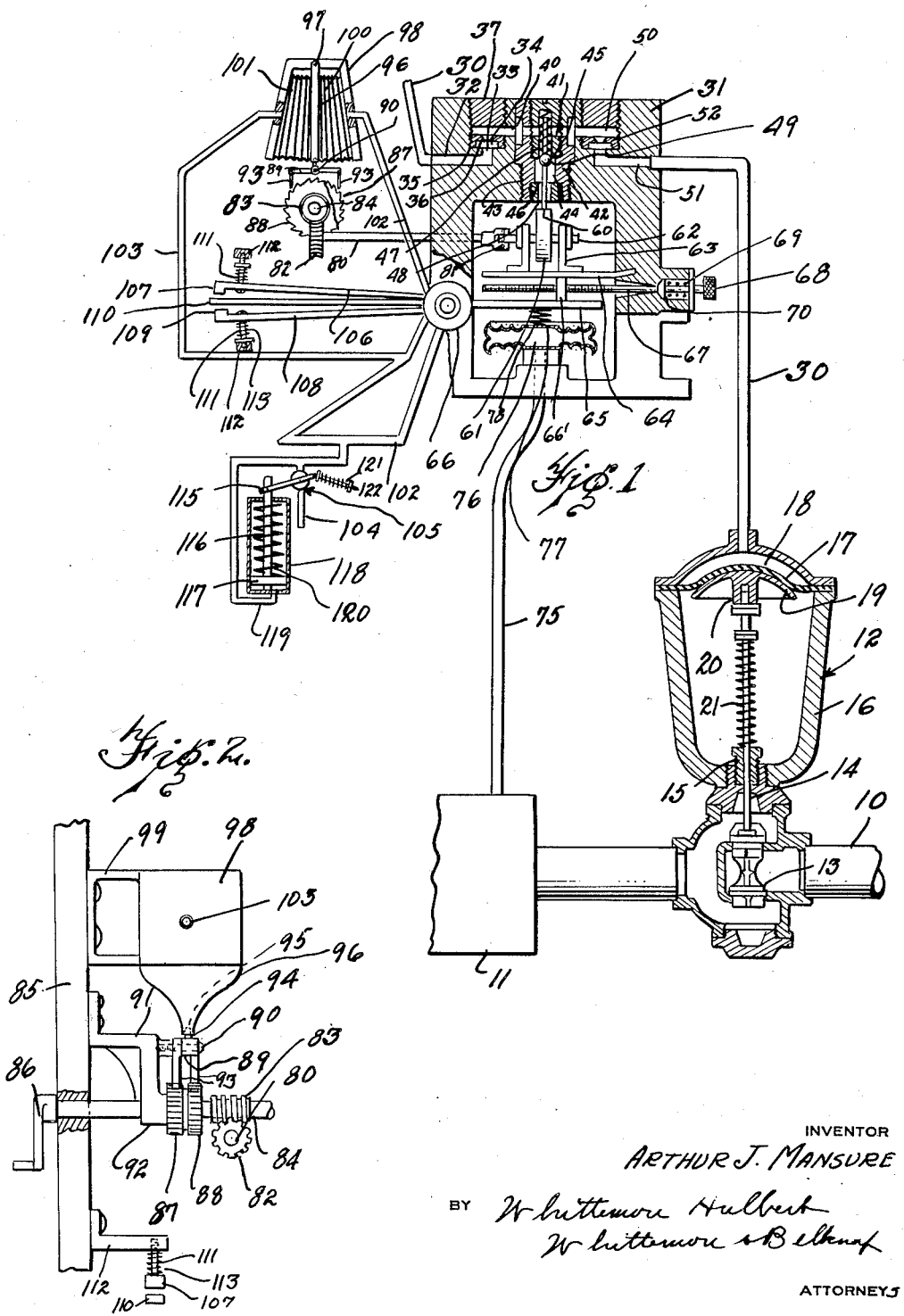

1,943,831

UNITED STATES PATENT OFFICE 1,943,831

AUTOMATIC TEMPERATURE OR PRESSURE CONTROLLER

Arthur J. Mansure, Detroit, Mich., assignor to The Bristol Company, Waterbury, Conn., a corporation of Connecticut Application November 23, 1929
Serial No. 409,349

14 Claims. (Cl. 236—86)

This invention relates to control mechanisms and has as a primary object to provide means for controlling the flow of fluid or the like through a conduit.

The invention numbers among its objects the provision of primary and secondary controls which will accurately control the flow of fluid through a conduit and which will be automatically set to take care of unusual changes in the demand for the fluid.

Other objects and advantages of the invention together with the numerous novel details of construction will become more apparent as the following description proceeds, particularly when reference is had to the accompanying drawing wherein, Figure 1 is a semi-diagrammatic view of a control system constructed in accordance with the teachings of this invention, and Figure 2 is a fragmentary elevational view of a portion of the structure shown in Figure 1.

Referring then particularly to the drawing wherein like reference characters designate corresponding parts throughout all views, the numeral 10 designates a conduit for supplying a fluid to a point of use such as the chamber 11. While the fluid supplied through the pipe 10 may be a heating, cooling or pressure controlling fluid, the invention will be described in connection with a system wherein the pipe 10 supplies a heating fluid to the chamber 11 for heating a volume of water in the chamber.

The numeral 12 designates generally a motor diaphragm valve for controlling the flow of fluid through the conduit 10 and this valve includes the valve member 13 connected to a stem 14 slidable in a bearing 15 carried by the supporting bracket 16. This supporting bracket carries at its upper end a diaphragm 17 closing one end of a pressure chamber 18, and the valve stem is operated by this diaphragm by means of a plate 19 which abuts the diaphragm and which is provided with the stem 20 having a socket for receiving the end of the valve stem. A spring 21 surrounds the valve stem and tends to move the valve to open position against the pressure within the chamber 18.

Air under pressure is supplied to the chamber 18 from any suitable source (not shown) by means of a pipe or conduit 30. This pipe is broken intermediate its ends to receive a body or casting 31 which contains means for permitting the air to exhaust from the pipe 30 and chamber 18 and to control the amount of this exhaust to thus control the pressure within the chamber 18 and the actuation of the diaphragm 17. By reference to Figure 1 of the drawing it will be noted that the body 31 is provided with a bore 32 communicating with the supply side of the pipe 30. This bore is horizontally arranged within the body 31 and terminates in an upwardly extending portion 33 which opens into a chamber 34. An orifice plate 35 provided with the restricted orifice 36 is mounted in the base of the chamber 34 for a purpose hereinafter to be more fully described. The top of the chamber 34 is closed by a plug 37 whereby access may be had from the top of the body 31 to the orifice plate 35.

The chamber 34 communicates by means of a port 40 with a bore 41 formed in a valve body 42 which is threaded in a bore 43 formed in the body 31. The valve body 42 is provided with a chamber 44 and mounted in opposite ends of this chamber are the valve seats 45 and 46 respectively, the valve seat 45 being provided with a passage 47 communicating with the bore 41 and the valve seat 46 being provided with a passage 48 communicating with the atmosphere. A valve 49 mounted in the chamber 44 is adapted to seat on one or the other of the valve seats to control communication between the bore 41 and the atmosphere.

The bore 41 communicates with a chamber 50 formed in the body 31 and this chamber in turn communicates with a bore 51 which in turn is connected to the other section of the air supply pipe 30. An orifice plate 52 similar to the orifice plate 35 is arranged in the chamber 50 between the outlet end of this chamber and the bore 51.

The valve 49 controls the exhaust of air from the pipe 30 and thus controls the pressure within the chamber 18 and the actuation of the valve 12. For actuating the valve 49, this valve is provided with a valve stem 60 which rests on the periphery of a cam 61 carried by a shaft 62. This shaft is supported in brackets 63 which in turn rest on a plate 64 pivoted at its end in one side of the body 31. A second plate 65 is pivoted as at 66 in the other side of the body 31 in spaced relation to the plate 64 and a roller or the like 66' is arranged between the plates 64 and 65 for transmitting the movement of the one to the other. The roller 66' is mounted for longitudinal adjustment on the threaded shaft 67 which projects through the side of the body 31 and carries on its end a handle 68. A spring 69 surrounding the shaft 67 engages a collar 70 on this shaft for urging the shaft inwardly and thus maintaining the roller 66' in its adjusted position. Obviously rotation of the shaft 67 effects a longitudinal adjustment of the roller 66' relative to the pivot points of the plates 64 and 65 to thus adjust the movement of the plate 64 incident to any given movement of the plate 65.

For moving the plate 65 upon changes of temperature within the chamber 11, a thermostat (not shown) is mounted within the chamber 11 and is connected by means of a conduit 75 with a diaphragm chamber 76 carried by the body 31. This diaphragm chamber is provided with the flexible top 77 and arranged between this top wall and the plate 65 is a spring 78 for transmitting the movement of the one to the other.

The arrangement as thus far described functions as follows. The roller 66' and cam 61 are adjusted to maintain a set air pressure within the chamber 18 to hold the valve 12 at its best working position and to permit a predetermined flow of the heating fluid to the chamber 11. Upon slight variations in the temperature within chamber 11, the wall 77 of the diaphragm chamber 76 will be actuated to actuate the valve 49 and to thus increase or decrease the pressure in chamber 18. Thus, as the temperature within chamber 11 increases the valve 49 will be moved toward closed position and pressure will build up in chamber 18 to move the valve 12 toward closed position. If on the other hand the temperature within chamber 11 decreases the valve 49 will be moved toward open position permitting more air to exhaust from chamber 18, thus permitting the spring 21 to move the valve 12 toward open position. The orifice plate 35 renders the actuation of the valve 49 more sensitive while the orifice plate 52 slows up the actuation of the valve 12 by the diaphragm 17.

The present invention contemplates in particular the provision of auxiliary means for adjusting the setting of the pressure within the chamber 18 to take care of an unusual increase or decrease in the demand for the fluid supplied by pipe 10. Thus, for example, if the volume of water to be heated in the chamber 11 is substantially increased, the auxiliary means provided by this invention functions to adjust the setting of the pressure within chamber 18 to take care of the increased demand for the heating fluid. To accomplish this result there is provided a shaft 80 connected as by a universal joint 81 to the shaft 62. The shaft 80 carries at its end a worm-wheel 82 adapted to be rotated by a worm 83 carried by a shaft 84. The shaft 84 is journaled in a support 85 and is provided on its end with a handle 86 whereby the same may be manually operated to effect a manual adjustment of the cam 61.

Fixed to the shaft 84 intermediate its ends are the ratchet wheels 87 and 88 adapted to be engaged by a double pawl 89 pivoted as at 90 on a bracket 91 carried by the support 85. This bracket is preferably provided at its end with a bearing portion 92 for the shaft 84 and the double pawl 89 is preferably provided at its ends with the pawl fingers 93 for engaging the ratchets 87 and 88.

Formed integral with the member 89 is a lever 94 and this lever is loosely mounted in a socket 95 formed in the end of a lever 96 pivoted as at 97 to a bracket 98 fixed to the support 85 by the arms 99. The lever 96 is widened intermediate its ends to form a common intermediate wall for a pair of diaphragm chambers 100 and 101 respectively, the opposite ends of these chambers being closed by the sides of the bracket 98.

Communicating with the chambers 100 and 101 are the conduits 102 and 103 respectively and these conduits are in turn supplied with air under pressure by a suitable air supply pipe 104 controlled by a valve designated generally by the reference character 105. Communicating with the conduit 102 is a branch pipe 106 which terminates in a discharge nozzle 107 and communicating with the conduit 103 is a similar branch pipe 108 terminating in a discharge nozzle 109. The nozzles 107 and 109 are arranged in spaced relative to each other and on opposite sides of a valve member 110 which constitutes an extension of the plate 65. The branches 106 and 108 are adjustably supported for movement toward and away from each other by studs 111 which threadedly engage supporting arms 112 carried by the support 85 and these branches are urged toward each other by a spring 113 which surrounds the studs in the manner clearly illustrated in Figure 2 of the drawing.

For actuating the valve 105 there is provided a link 115 connected to the end of a piston rod 116 which carries the piston 117 reciprocable in a cylinder 118. A conduit 119 communicates at its one end with the bottom of the cylinder and at its other end with the air supply pipe 104 beyond the valve 105. A spring 120 normally holds the piston 117 in its lowermost position against the pressure of the air while a spring 121 mounted on a link 122 engages the end of the link 115 to move this link with a snap action when the piston 117 is moved from one of its positions to the other.

The operation of this portion of the invention is as follows. Air under pressure is constantly supplied to the conduits 102 and 103 by the pipe 104, the valve 105 normally being in open position as illustrated in Figure 1 of the drawing. The air supplied to the conduits 102 and 103 is normally exhausted through the ports or nozzles 107 and 109, the diaphragm chambers 100 and 101 being in the position shown in Figure 1 of the drawing. If, however, the plate 65 moves a predetermined distance about its pivot, the valve member 110 which moves with this plate is actuated to close one or the other of the ports 107 or 109 to thus build up pressure in one of the chambers 100 and 101. Thus if the port 109 is closed, pressure is built up in the chamber 101, thus forcing the lever 96 to the right as viewed in Figure 1 and engaging one of the pawl fingers 93 with one of the ratchets 87 or 88. As pressure is built up in the conduit 103 the piston 117 is actuated and upon a predetermined movement of this piston, the valve 105 is actuated to cut off the supply of air under pressure. The air in the system will then be exhausted through the port 107 and diaphragm chambers 100 and 101 will return to their normal position. This operation will continue as long as the port 109 is closed and the shaft 84 will thus be rotated with a step-by-step movement. Rotation of the shaft 84 will effect an adjustment of the cam 61 and will thus change the setting of the air pressure in the chamber 18. It will be understood that the ratchets 87 and 88 have oppositely inclined teeth so that the shaft 84 will be rotated in one or the other direction, dependent upon whether the port 107 or 109 is closed.

From the above it is believed that the operation of the invention will be clearly apparent. The roller 66' and cam 61 will be first adjusted manually to maintain a set air pressure within the chamber 18 to permit a predetermined flow of fluid to the chamber 11. Upon slight variations in the temperature within chamber 11 valve 49 will be actuated to vary the pressure within chamber 18 and to thus actuate the valve 12. The ports 107 and 109 are so spaced relative to the member 110 that the plate 65 may oscillate between predetermined limits without effecting a closing of either of these ports.

If, however, the demand for the fluid should be substantially increased as would occur if the volume of water within chamber 11 were substantially increased, the plate 65 would move beyond the predetermined set limits and the port 107 would be closed which would effect a building up of the pressure in conduit 102 and would cause the lever 96 to be moved to the left as viewed in Figure 1. This will effect an actuation of the member 89 and will effect a rotation of the shafts 80 and 84 and an adjustment of the cam 61 to move the valve 49 toward open position. This would result in a decrease in the pressure within chamber 18 and a further opening of the valve 12. After the pressure within the chamber 18 is set as above described to take care of the increased demand the auxiliary means ceases to operate because of the fact that the plate 65 returns to its normal position and the primary control will continue to function with the chamber 18 set at the reduced pressure. If the demand should subsequently be again changed either by an increase or decrease, pressure within the chamber 18 will again be automatically set to take care of this changed demand.

From the above it will be apparent that the invention contemplates the provision of means for actuating a control valve to permit the flow of a fluid to a point of use. The invention provides primary and secondary controls which will efficiently function to accurately control the flow of a fluid to a point of use in direct dependence upon the requirement for the fluid.

While the auxiliary control has been described as being operated by air under pressure it will be readily understood that this auxiliary control might be operated by any fluid under pressure or by any other source of power. It will be further understood that the right is reserved to make such changes in the details of construction and arrangement of parts as will fall within the purview of the attached claims.

What I claim as my invention is:

1. In combination a fluid supply conduit, a valve for controlling the flow of fluid through said conduit, means for supplying air under pressure to said valve to actuate the same, an auxiliary valve for controlling the pressure of the air acting on said first mentioned valve, means for actuating said auxiliary valve in dependence upon the demand for the fluid and means for modifying the actuation of said auxiliary valve upon a predetermined change in the demand for the fluid.

2. In combination a motor diaphragm valve for controlling the flow of a heat exchange fluid to a chamber, means for adjusting the pressure acting on said valve to maintain a predetermined flow of said fluid to the chamber, means controlled by the temperature in said chamber for varying the pressure acting on said valve between predetermined limits, and means operable upon a predetermined change in the temperature within said chamber for actuating said adjusting means to vary the normal pressure acting on said valve.

3. In combination, a motor diaphragm valve for controlling the flow of a heat exchange fluid to a chamber, a conduit for supplying air under pressure to said motor diaphragm valve to control the actuation of the same, said conduit being provided with an exhaust port, an auxiliary valve for controlling said exhaust port, a thermostatically controlled member exposed to the temperature in said chamber, a connection between said thermostatically controlled member and said auxiliary valve for actuating the one from the other, and means for adjusting said connection to vary the effective actuation of said auxiliary valve upon a predetermined change in the temperature in said chamber.

4. In combination, a motor diaphragm valve for controlling the flow of a heat exchange fluid to a chamber, means for supplying air under pressure to said valve to actuate the same, means for maintaining the pressure acting on said valve within predetermined limits to maintain a predetermined desired flow of fluid to said chamber, means controlled by the temperature in said chamber for varying the pressure acting on said valve between said limits, and means operable upon a predetermined change in the temperature within said chamber for varying the normal pressure maintained on said valve.

5. In combination, a motor diaphragm valve for controlling the flow of a heat exchange fluid to a chamber, means for supplying air under pressure to said motor diaphragm valve to actuate the same, an auxiliary valve for controlling the pressure acting on said motor diaphragm valve, a thermo responsive member exposed to the temperature within said chamber, a plate like lever actuated by said thermo responsive member, a connection between said plate like lever and said auxiliary valve for actuating the latter upon movement of the former, and means operable upon a predetermined change in the temperature within said chamber to adjust said connection to vary the actuation of said valve by said plate like lever.

6. In combination, a motor diaphragm valve for controlling the flow of a heat exchange fluid to a chamber, means for supplying air under pressure to said motor diaphragm valve to actuate the same, an auxiliary valve for controlling the pressure acting on said motor diaphragm valve, a thermo responsive member exposed to the temperature in said chamber, a connection including a cam arranged between said thermo responsive member and said auxiliary valve for actuating the latter from the former, and means operable upon a predetermined change in the temperature in said chamber for actuating said cam to adjust the actuation of said auxiliary valve by said thermo responsive member.

7. In combination, a motor diaphragm valve for controlling the flow of a heat exchange fluid to a chamber, means for supplying air under pressure to said motor diaphragm valve to actuate the same, an auxiliary valve for controlling the pressure acting on said motor diaphragm valve, a thermo responsive member exposed to the temperature within said chamber, a plate like lever actuated by said thermo responsive member, a cam engaging said auxiliary valve, means for moving said cam by said plate like lever, and means for rotating said cam upon a predetermined change in the temperature within said chamber for adjusting the actuation of said auxiliary valve by said thermo responsive member.

8. In combination, a motor diaphragm valve for controlling the flow of a heat exchange fluid to a chamber, means for supplying air under pressure to said motor diaphragm valve to actuate the same, an auxiliary valve for controlling the pressure acting on said motor diaphragm valve, a thermo responsive member exposed to the temperature within said chamber, a plate like lever actuated by said thermo responsive member, a cam engaging said auxiliary valve, means for moving said cam by said plate like lever, and means for rotating said cam upon a predetermined change in the temperature within said chamber for adjusting the actuation of said auxiliary valve by said thermo responsive member, said last mentioned means including a worm wheel for rotating said cam, a worm engageable with said worm wheel, and means operable upon a predetermined movement of said plate like lever for effecting a rotation of said worm.

9. In combination, a main control for regulating the supply of a temperature modifying medium, an auxiliary control for controlling the actuation of said main control, a temperature responsive means, means for actuating said auxiliary control in dependence upon the actuation of said temperature responsive means, and means for modifying the effective actuation of said auxiliary control incident to any predetermined actuation of said temperature responsive means upon a predetermined actuation of said temperature responsive means.

10. In combination, a main control for regulating the supply of a temperature modifying medium to a point of use, an auxiliary control for controlling the actuation of said main control, means operable upon minor changes in the temperature at the point of use for actuating said auxiliary control, and means operable upon major changes in the temperature at the point of use for modifying the effective actuation of said auxiliary control incident to any predetermined actuation of said first mentioned means.

11. In combination, a main valve for controlling the flow of a heat exchange fluid to a chamber, means including an auxiliary valve for controlling the actuation of said main valve, a temperature responsive device in said chamber, means for actuating said auxiliary valve from said temperature responsive device, and means operable upon a predetermined change in the temperature in said chamber to modify the effective actuation of said auxiliary valve incident to any predetermined actuation of said temperature responsive device.

12. In combination, a main valve for controlling the flow of a heat exchange fluid to a chamber, an auxiliary valve directly controlling the actuation of said main valve, and means for actuating said auxiliary valve in dependence upon the temperature in said chamber, said means including minor control means for making slight changes in the position of said auxiliary valve incident to slight changes in the temperature in said chamber, and major control means for making major changes in the position of said auxiliary valve upon major changes in the temperature in said chamber.

13. In combination, a main control valve for controlling the flow of a heat exchange medium to a chamber, an auxiliary valve for controlling the actuation of said main valve, a temperature responsive device responsive to the temperature in said champer, a connection between said temperature responsive device and said auxiliary valve for actuating the latter from the former, and means for adjusting said connection to modify the effective actuation of said auxiliary valve by said temperature responsive device upon a predetermined change in the temperature of said chamber.

14. In combination, a main control for regulating the flow of a fluid to a point of use, an auxiliary control controlling the actuation of said main control, a member movable in response to demands for the fluid, means for actuating said auxiliary control by said member, and means operable upon predetermined changes in the demand for the fluid to vary the effective actuation of said auxiliary control incident to any predetermined movement of said member.

ARTHUR J. MANSURE.